(12) United States Patent
Evans

(10) Patent No.: US 10,544,566 B2
(45) Date of Patent: Jan. 28, 2020

(54) MACHINE ORIENTATION DISPLAY FOR MACHINES

(71) Applicant: Caterpillar Inc., Peoria, IL (US)

(72) Inventor: Timothy A. Evans, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 351 days.

(21) Appl. No.: 15/588,190

(22) Filed: May 5, 2017

(65) Prior Publication Data
US 2018/0320340 A1 Nov. 8, 2018

(51) Int. Cl.
*E02F 9/26* (2006.01)
*E02F 3/76* (2006.01)
*G07C 5/08* (2006.01)
*G05D 1/00* (2006.01)

(52) U.S. Cl.
CPC ............ *E02F 9/264* (2013.01); *G05D 1/0044* (2013.01)

(58) Field of Classification Search
CPC ................ G05D 1/0044; G05D 2201/0202
See application file for complete search history.

(56) References Cited

U.S. PATENT DOCUMENTS

| | | |
|---|---|---|
| 6,097,425 A | 8/2000 | Behnke et al. |
| 6,230,818 B1 | 5/2001 | Slunder |
| 8,139,108 B2 | 3/2012 | Stratton et al. |
| 8,347,977 B2 | 1/2013 | Hendron et al. |
| 8,924,098 B2 | 12/2014 | Zhdanov et al. |
| 9,322,147 B2 | 4/2016 | Date |
| 9,359,083 B2 | 6/2016 | Olive |
| 10,017,919 B2 * | 7/2018 | Nomura ................... E02F 3/435 |
| 2008/0180523 A1 * | 7/2008 | Stratton ............... G05D 1/0044 348/114 |
| 2009/0177337 A1 * | 7/2009 | Yuet ..................... G05D 1/0044 701/2 |
| 2010/0299031 A1 * | 11/2010 | Zhdanov ................ E02F 3/845 701/50 |
| 2012/0201640 A1 * | 8/2012 | Jessen ..................... E02F 3/434 414/694 |
| 2013/0004282 A1 * | 1/2013 | Grimes ..................... E02F 3/96 414/698 |
| 2013/0180744 A1 | 7/2013 | Favreau et al. |

(Continued)

FOREIGN PATENT DOCUMENTS

DE 10308897 A1 10/2004

*Primary Examiner* — Thomas G Black
*Assistant Examiner* — Ce Li Li
(74) *Attorney, Agent, or Firm* — Miller, Matthias & Hull

(57) ABSTRACT

A machine orientation display may be displayed by an operator display device in an operator station of a machine. The machine orientation display may include a field area, a horizontal reference displayed on the field area, a machine orientation indicator displayed on the field area and positioned and oriented relative to the horizontal reference to graphically indicate a machine orientation of the machine relative to a work surface on which the machine is disposed. The machine orientation display may further include an implement orientation indicator displayed on the field area and positioned and oriented relative to the horizontal reference and the machine orientation indicator to graphically indicate an implement orientation of an implement of the machine. The implement is movable relative to a machine body of the machine and to the work surface.

16 Claims, 8 Drawing Sheets

(56) References Cited

U.S. PATENT DOCUMENTS

| | | | |
|---|---|---|---|
| 2014/0176709 A1* | 6/2014 | Redenbo | H04N 7/18 |
| | | | 348/143 |
| 2014/0257732 A1* | 9/2014 | Kingdon | G01C 9/02 |
| | | | 702/94 |
| 2014/0326471 A1 | 11/2014 | Zhu et al. | |
| 2014/0330508 A1* | 11/2014 | Montgomery | G01C 21/04 |
| | | | 701/408 |
| 2015/0292179 A1* | 10/2015 | Joergensen | G01C 15/004 |
| | | | 701/50 |
| 2016/0010312 A1* | 1/2016 | Kurihara | E02F 3/435 |
| | | | 701/36 |
| 2016/0196769 A1* | 7/2016 | Fletcher | G09B 19/167 |
| | | | 434/65 |
| 2016/0230367 A1 | 8/2016 | Hendron et al. | |
| 2019/0024346 A1* | 1/2019 | Nishi | E02F 9/264 |

* cited by examiner

MACHINE ORIENTATION DISPLAY FOR MACHINES

TECHNICAL FIELD

The present disclosure generally relates to work machines and, more particularly, relates to graphical displays of orientations of the work machines and of implements of the work machines.

BACKGROUND

Work machines (such as bulldozers, motor graders or the like) include blades, buckets or other implements used to dig dirt, rock, gravel or the like that may be encountered by the work machine, or to grade or contour a work surface over which the work machine is traveling. The work machine will have a corresponding machine pitch (rotation about a transverse axis when traveling uphill, downhill or horizontal) and machine roll (rotation about a longitudinal axis when traveling on the side of a mound or hill). The implement of the work machine, which is typically configured at the front of track-type bulldozers, excavators or similar machines and at a middle position between the front and rear wheels on motor graders, will have an implement vertical position and an implement roll relative to a body or frame of the work machine, and may also have an adjustable implement pitch. The work machines do not always have an adequate display or system that allows an operator of the work machine to easily determine whether the blade is aligned properly relative to the work machine to properly perform a work operation on the work surface. When the work machine is in the process of using the implement to dig up material from the work surface, the operator may often lose sight of the implement as it goes below grade or lose sight of the implement due to visual obstruction by other components of the work machine. When the operator loses sight of the implement, it may become harder for the operator to determine the implement's position with respect to the work machine, and the position of the implement relative to the work surface.

Current work machines of this type with digging implements do not have displays to indicate the orientation of the implement with respect to the orientation of the work machine. Instead, a series of indicators or numbers may be utilized to indicate the pitch and roll of the work machine, and the elevation and roll of the blade. In one example, U.S. Pat. No. 9,322,147, discloses an information display device that is mounted in a construction machine that displays various types of information of the construction machine. A blade is arranged in front of the body of the construction machine. The display devices show a plurality of icons that are expressed by a numerical value. With such display devices, the operator of the work machine may have to be cognizant of these indicators when attempting to determine whether the implement is positioned properly with respect to the work machine and the work surface. The operator may accordingly find it difficult to operate the work machine and accurately perform the work operation while remaining cognizant of the indicators. As a result, it may be harder for the operator to precisely determine whether the implement has the proper position and orientation during a digging or lifting operation. The operator may not have a consistent sight of the implement when digging, lifting and other excavation operations. In some instances, the operator may stop the work machine temporarily to determine the actual implement position and orientation, thereby increasing the time and reducing the efficiency of performing the work operations.

An additional problem with the operator having difficulty determining the position and orientation of the blade is the operator potentially not knowing when to terminate an excavation operation. The operator may perform a digging or lifting operation that is too long or too short as a result of trying to estimate the implement elevation and roll. As a result, the work operation may need to be performed again if the work surface has not be excavated properly.

SUMMARY OF THE DISCLOSURE

In one aspect of the present disclosure, a machine orientation display is disclosed. The machine orientation display is displayed by an operator display device in an operator station of a machine. The machine orientation display may include a field area, a horizontal reference displayed on the field area, a machine orientation indicator displayed on the field area and being positioned and oriented relative to the horizontal reference to graphically indicate a machine orientation of the machine relative to a work surface on which the machine is disposed, and an implement orientation indicator displayed on the field area and being positioned and oriented relative to the horizontal reference and the machine orientation indicator to graphically indicate an implement orientation of an implement of the machine. The implement is movable relative to a machine body of the machine and to the work surface.

In another aspect of the present disclosure, a method for displaying a machine orientation of a machine to an operator of the machine is disclosed. The method may include sensing, by a machine orientation sensor, a machine orientation parameter value of a machine orientation parameter that is indicative of a the machine orientation of the machine, determining, at an electronic control module (ECM) of the machine, the machine orientation of the machine based on the machine orientation parameter value, transmitting, from the ECM to an operator display device within an operator station of the machine, machine orientation display signals, and generating, at the operator display device, a machine orientation display of the machine orientation using the machine orientation display signals transmitted by the ECM. The machine orientation display includes a horizontal reference and a machine orientation indicator, and a machine indicator vertical position of the machine orientation indicator relative to the horizontal reference indicates a machine pitch angle of the machine about a transverse axis of the machine.

In a further aspect of the present disclosure, a machine is disclosed. The machine may include a machine body, an implement that is movable relative to the machine body, a machine orientation sensor mounted on the machine body. The machine orientation sensor may be configured to detect a machine orientation parameter value of a machine orientation parameter that is indicative of a machine orientation of the machine body, and to transmit machine orientation sensor signals with machine orientation parameter values corresponding to the machine orientation. The machine may further include an implement orientation sensor associated with the implement and configured to detect an implement orientation parameter value of an implement orientation parameter that is indicative of an implement orientation of the implement, and to transmit implement orientation sensor signals with implement orientation parameter values corresponding to the implement orientation. An operator display device may be disposed within an operator station of the machine and configured to receive display signals, and to generate a visual display corresponding to display information in the display signals. The machine may also include an electronic control module (ECM) operatively connected to the machine orientation sensor, the implement orientation sensor and the operator display device. The ECM may be configured to receive the machine orientation sensor signals and the implement orientation sensor signals, to generate machine orientation display signals corresponding to the machine orientation parameter values and implement orientation display signals corresponding to the implement orientation parameter values, and to transmit the machine orientation display signals and the implement orientation display signals to the operator display device to cause the operator display device to generate a machine orientation display. The machine orientation display may include a field area, a horizontal reference displayed on the field area, a machine orientation indicator displayed on the field area and being positioned and oriented relative to the horizontal reference to graphically indicate a machine orientation of the machine, and an implement orientation indicator displayed on the field area and being positioned and oriented relative to the horizontal reference and the machine orientation indicator to graphically indicate an implement orientation of the implement.

Additional aspects are defined by the claims of this patent.

DETAILED DESCRIPTION

Figure 1:
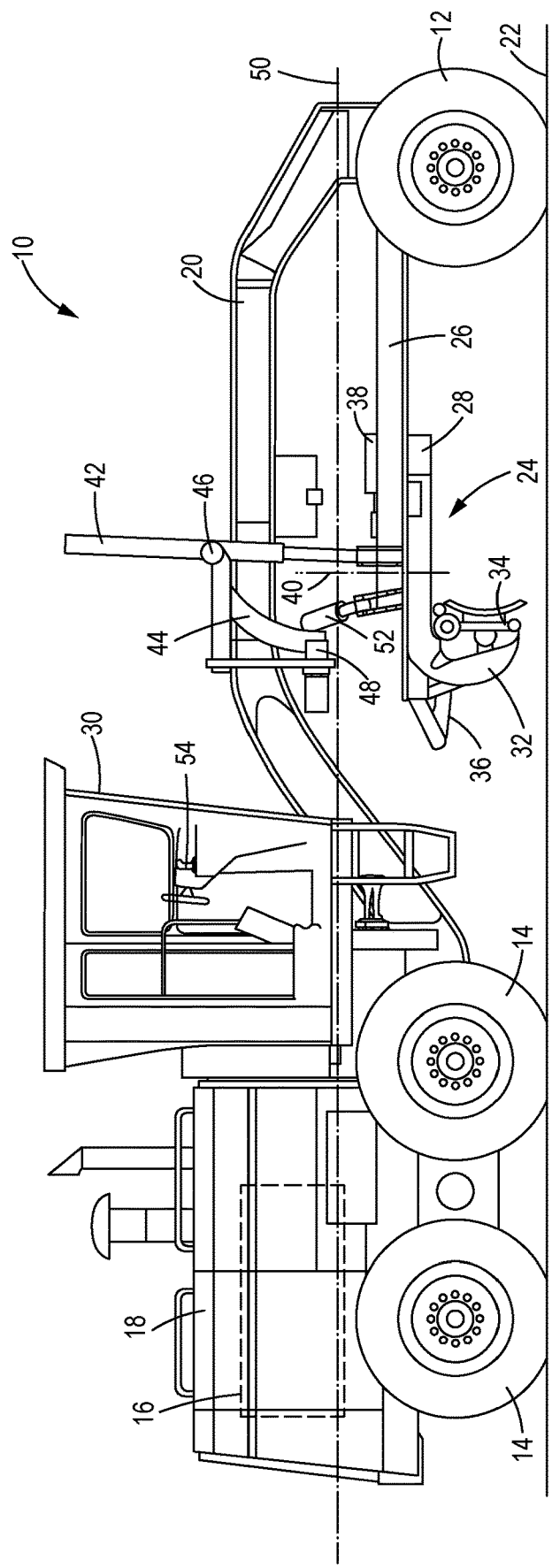
FIG. 1 is a side view of a machine such as a motor grader.
Figure 2:
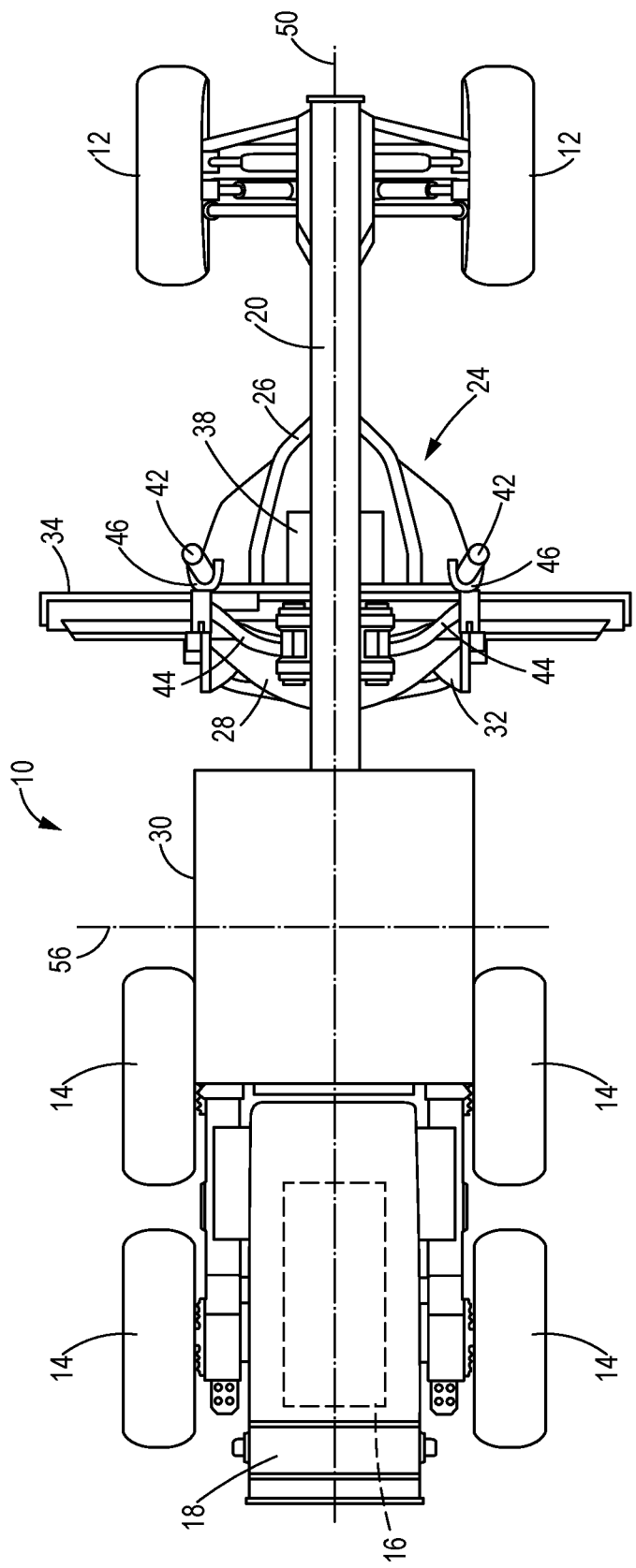
FIG. 2 is a top view of the motor grader of FIG. 1.

An exemplary embodiment of a machine 10 in which a machine orientation display in accordance with the present disclosure may be implemented is illustrated in FIGS. 1 and 2. The illustrated machine 10 is a motor grader, but other machines having implements with adjustable vertical positions and rolls such as backhoe loaders, agricultural tractors, wheel loaders, skid-steer loaders and/or the like may be provided with machine orientation displays of the type disclosed herein. The motor grader 10 may include steerable traction devices 12, driven traction devices 14, a power source 16 within a main body 18 of the motor grader 10 and supported by the driven traction devices 14, and a frame 20 connecting the steerable traction devices 12 to the main body 18. The steerable traction devices 12 and the driven traction devices 14 may include one or more wheels located on each side of the motor grader 10 (both sides shown in FIG. 2). The wheels may be rotatable and/or tiltable for use during steering and leveling of a work surface 22. Alternatively, the steerable traction devices 12 and/or the driven traction devices 14 may include tracks, belts, or other traction devices known in the art.

The motor grader 10 as illustrated includes a work implement such as, for example, a drawbar-circle-moldboard (DCM) assembly 24 including a drawbar 26 that is supported by the frame 20 and a multi-dimensional rotational connector such as a ball and socket joint (not shown) located proximal the steerable traction devices 12. A circle 28 is mounted on the drawbar 26 at an end opposite the connection to the frame 20, and proximate the main body 18 and an operator station 30. A moldboard 32 is mounted to the circle 28, and a blade 34 is mounted to the moldboard 32 in manner that allows a pitch of the blade 34 to be controlled by extending and retracting a blade pitch cylinder 36. A circle rotation control device 38 is actuatable by an operator of the motor grader 10 to rotate the circle 28 and, correspondingly, the blade 34 about a vertical rotational axis 40.

The DCM assembly 24 is suspended from the frame 20 by a pair of lift cylinders 42 that are operable to control the vertical position and the roll of the blade 34 with respect to the main body 18 and the frame 20 of the motor grader 10 and the work surface 22. Each lift cylinder 42 is rotatably connected to a lift arm 44 by a corresponding yoke 46 that allows rotation of the lift cylinder about two axes relative to the lift arm 44. The lift arms 44 are in turn pivotally connected to the frame 20. A link bar 48 is pivotally connected to the lift arms 44 so that the frame 20, the lift arms 44 and the link bar 48 form a four-bar linkage having joints with rotational axes that are parallel to a longitudinal axis 50 of the motor grader 10. The link bar 48 may be configured to be positioned and locked in place relative to the frame 20 at any one of a plurality of discrete positions to maintain the four-bar linkage in a desired position as the motor grader 10 is operated to perform work operations on the work surface 22. With the link bar 48 locked in place, a side shift cylinder 52 can be extended and retracted to shift the DCM assembly 24 from side-to-side to position the blade 34.

Ends of the lift cylinders 42 are rotatably connected to the drawbar 26 by corresponding ball and socket joints (not shown). The rotational freedom provided by the yokes 46 and the ball and socket joints allow lift cylinders 42 to be extended and retracted together or independently to adjust both the vertical position and the roll of the blade 34. The blade 34 can be raised or lowered relative to the main body 18 and the frame 20 without changing the roll of the blade 34 by extending or retracting the lift cylinders 42 at rates that maintain the blade 34 at a constant rotational position about the longitudinal axis 50 of the motor grader 10. The blade 34 can also be rotated about the longitudinal axis 50 as viewed from the operator station 30 in either direction by extending and retracting the lift cylinders 42 at different times and at different rates to achieve a desired roll of the blade 34. The operation of the lift cylinders 42 to change the vertical position and the roll of the blade 34 can be manually controlled by the operator by manipulating implement position input devices 54, such as joysticks or other types of input devices, provided for the operator in the operator station 30.

Figure 3:
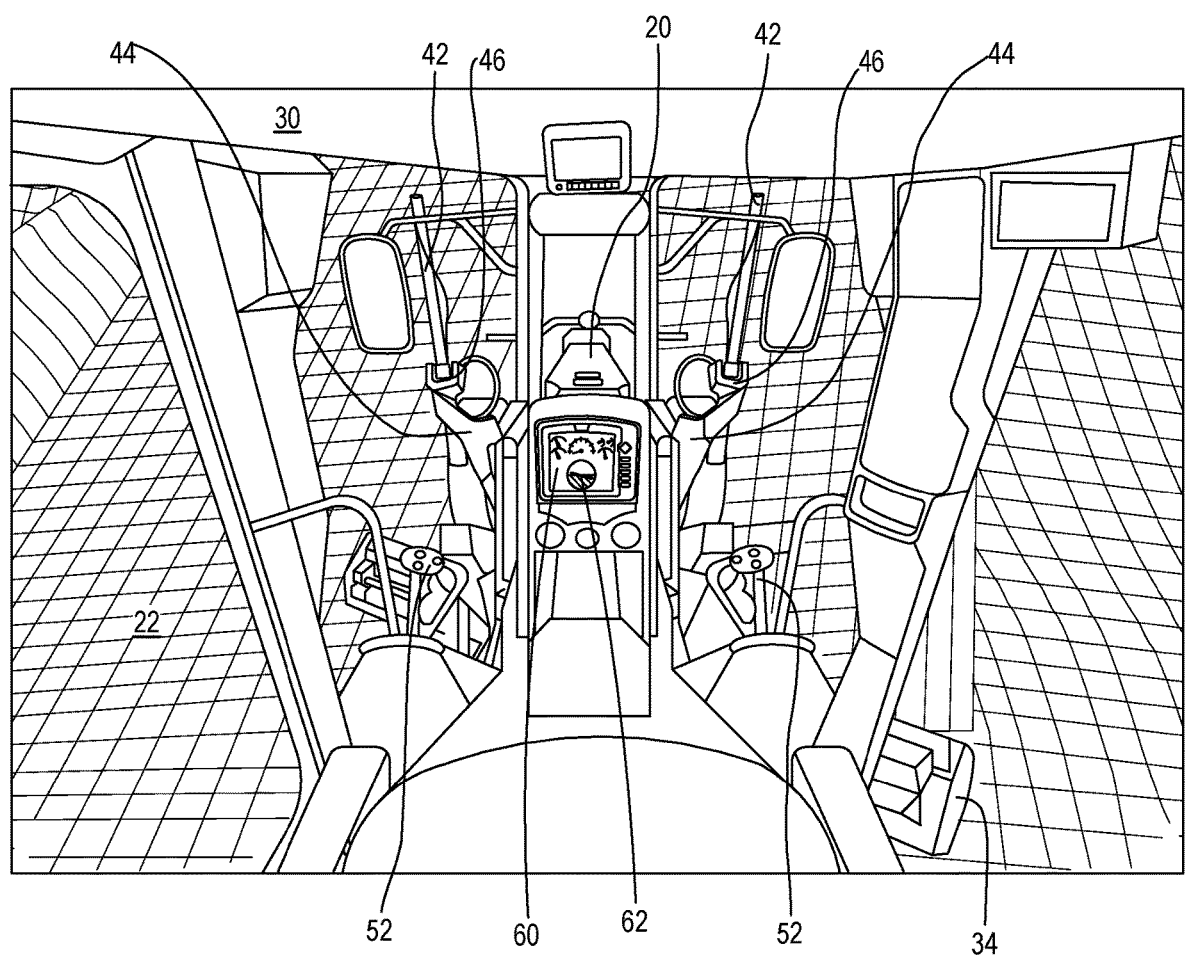
FIG. 3 is a pictorial illustration of an operator's view inside an operator station of the motor grader of FIG. 1 including an operator display device with a machine orientation display in accordance with the present disclosure.

The operator is provided with at least a partial view of the frame 20, the blade 34 and other components at the forward end of the motor grader 10 from inside the operator station 30. FIG. 3 illustrates the operator's perspective from the operator station 30 while the motor grader 10 is traveling over the work surface 22. The operator can adjust the position of the blade 34 relative to the main body 18, the frame 20 and the work surface 22 by manipulating the implement position input devices 54. However, from the operator's position above and behind the blade 34, observation alone is not sufficient for the operator to determine the exact positioning of the blade 34. Based solely on visual observation, the operator must guess as to whether the blade 34 is positioned to correctly perform the required work operations on the work surface 22. To assist the operator, an operator display device 60 may include a machine orientation display 62 in accordance with the present disclosure providing the operator with an integrated graphical representation of the machine pitch of the motor grader 10 relative to transverse axis 56 (FIG. 2), the machine roll of the motor grader 10 relative to the longitudinal axis 50 and to a horizontal reference, the implement vertical position of the blade 34 relative to the work surface 22, and the implement roll of the blade 34 relative to the longitudinal axis 50 and the horizontal reference. With the information provided by the machine orientation display 62, the operator of the motor grader 10 may more precisely know the position of the blade 34 relative to the main body 18 and the frame 20 of the motor grader 10, and relative to the work surface 22, so that the work operations on the work surface 22 may be performed more accurately and efficiently.

Figure 4:
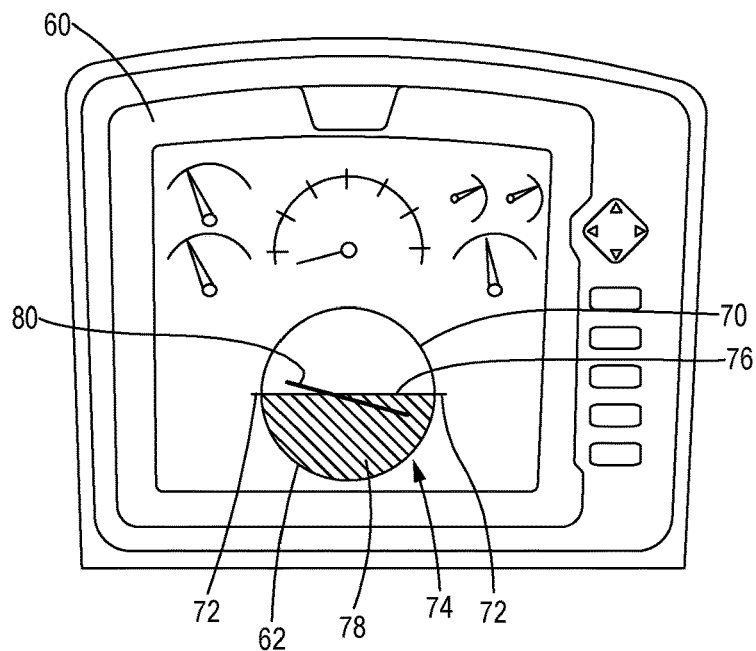
FIG. 4 is an enlarged view of the operator display device of FIG. 3.

FIG. 4 illustrates the operator display device 60 in greater detail. The operator display device 60 may provide information in other displays 64 in addition to the machine orientation display 62. The additional information can include operating parameters such as engine speed, ground speed, fuel level, oil temperature and the like. The operator station 30 may further include additional display devices as necessary to inform the operator of the operational status of the motor grader 10.

The machine orientation display 62 as illustrated may be an avionic style display, but other types of displays for graphically presenting the orientations of work machines and their implements in accordance with the present disclosure are within the scope of the present disclosure. The machine orientation display 62 as shown in FIG. 4 includes a circular field area 70 that may graphically represent the portion of the work area in front of the motor grader 10 and visible to the operator from the operator station 30. The circular field area 70 may include a horizontal reference line or lines 72 positioned approximately at a vertical midpoint of the circular field area 70. The horizontal reference lines 72 are oriented approximately parallel to the horizon when the work surface 22 on which the motor grader 10 is disposed or moving across his flat and causes no roll of the motor grader 10. The position of the horizontal references lines 72 will remain fixed with respect to the main body 18 and the frame 20 of the motor grader 10 as the motor grader 10 experiences pitch and roll during operation on the work surface 22.

The machine orientation display 62 further includes a machine orientation indicator 74 that may be moved relative to the horizontal reference lined 72 to provide a visual indication of the machine pitch and roll of the motor grader 10. In the illustrated embodiment, the machine orientation indicator 74 is a combination of a machine orientation line 76 and a lower shaded portion 78 to provide a contrast between upper and lower portions of the circular field area 70. The machine pitch of the motor grader 10 may be indicated by the position of the machine orientation line 76 above or below the horizontal reference lines 72. The machine orientation line 76 will be above the horizontal reference lines 72 when the motor grader 10 is pitched forward about the transverse axis 56 and moving downhill, and will be below the horizontal reference line 72 when the motor grader 10 is pitched backward and moving uphill. The machine roll of the motor grader 10 may be indicated by rotation of the machine orientation line 76 relative to the horizontal reference line 72. Clockwise rotation of the machine orientation line 76 may indicate that the motor grader 10 has rolled to the right and is on the side of a mound or hill with the left traction devices 12, 14 above the right traction devices 12, 14. Counterclockwise rotation of the machine orientation line 76 indicates that the motor grader 10 has rolled to the left and the right traction devices 12, 14 are above the left traction devices 12, 14.

The vertical position and roll of the blade 34 may be indicated on the machine orientation display 62 by an implement orientation line 80 on the circular field area 70 that overlays the machine orientation indicator 74. The implement orientation line 80 may illustrate the implement vertical position of the blade 34 relative to the work surface 22, and may illustrate the implement roll of the blade 34 about the machine longitudinal axis 50. The position of the implement orientation line 80 relative to the machine orientation line 76 provides the visual indication of the implement vertical position. The implement orientation line 80 will lie on the machine orientation line 76 when the blade 34 is positioned at level grade on the work surface 22. The implement orientation line 80 will be above the machine orientation line 76 when the blade 34 is raised above the work surface 22, and below the machine orientation line 76 when the blade 34 is lowered into the work surface 22 to grade or dig material from the work surface 22. The implement roll of the blade 34 as indicated by the implement orientation line 80 in a similar manner as the machine orientation line 76 indicates the machine roll. The implement orientation line 80 is rotated clockwise when the blade 34 is rolled to the right, and counterclockwise when the blade 34 is rolled to the left.

Figure 5:
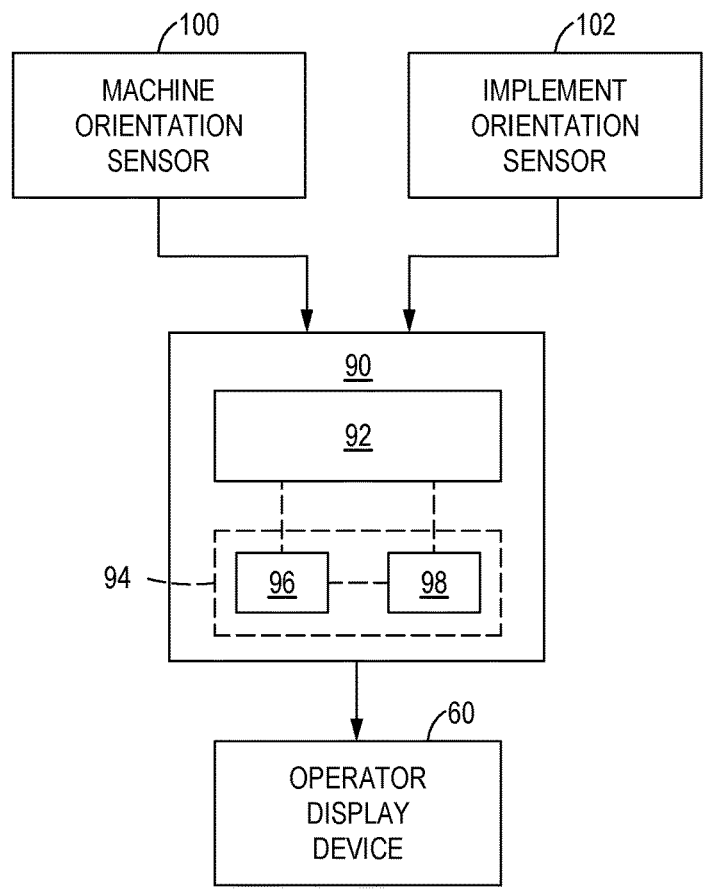
FIG. 5 is a schematic illustration of electrical components of the motor grader of FIG. 1.

Referring now to FIG. 5, the motor grader 10 may include various sensing and control components that are integrated to create the machine orientation display 62 on the operator display device 60. The motor grader 10 may include an electronic control module (ECM) 90 capable of receiving information in signals from control devices, sensors and other input devices, processing the received information using software stored therein, and outputting information to output devices such as actuators and displays that cause the motor grader 10 to operate and provide information to an operator of the motor grader 10. The ECM 90 may include a microprocessor 92 for executing a specified program, which controls and monitors various functions associated with the motor grader 10. The microprocessor 92 may include a memory 94, such as read only memory (ROM) 96, for storing a program, and a random access memory (RAM) 98 which serves as a working memory area for use in executing the program stored in the memory 94. The memory 94 as illustrated is integrated into the ECM 90, but those skilled in the art will understand that the memory 94 may be separate from the ECM 90 but onboard the motor grader 10, and/or remote from the ECM 90 and the motor grader 10, while still being associated with and accessible by the ECM 90 to store information in and retrieve information from the memory 94 as necessary during the operation of the motor grader 10. Although the microprocessor 92 is shown, it is also possible and contemplated to use other electronic components such as a microcontroller, an ASIC (application specific integrated circuit) chip, or any other integrated circuit device. While the discussion provide herein relates to the functionality for the machine orientation display 62, the ECM 90 may be configured to monitor and control other aspects of the operation of the motor grader 10. Moreover, the ECM 90 may refer collectively to multiple control and processing devices across which the functionality of the motor grader 10 may be distributed.

The input devices to the ECM 90 may include sensing devices that allow the ECM 90 to determine the positions and orientations of the motor grader 10 and the blade 34. A machine orientation sensor or sensors 100 may be mounted on the main body 18 or the frame 20 of the motor grader 10 and detect machine orientation parameters that indicate rotation of the motor grader 10 about the longitudinal axis 50 (machine roll) and the transverse axis 56 (machine pitch). In some embodiments, the machine orientation sensor 100 may be an inertial measurement unit (IMU) capable of measuring rotation about multiple axes. The IMU may include a combination of accelerometers, gyroscopes and magnetometers integrated to sense the motion of a body such as the motor grader 10 to which the IMU is attached. Additionally, or alternatively, the machine orientation sensor 100 may include multiple sensing devices each measuring a component of the machine orientation. When movement of the motor grader 10 is detected, or at periodic intervals when the motor grader 10 is turned on, the machine orientation sensor(s) 100 may transmit machine orientation sensor signals to the ECM 90 having machine orientation parameter values corresponding to the detected machine orientation. The ECM 90 is configured to process the machine orientation parameter values to determine a current machine orientation of the motor grader 10. Alternative sensor devices capable of sensing the movement and/or orientation of the motor grader 10 and communicating machine orientation parameter values to the ECM 90 are contemplated.

The input devices may further include an implement orientation sensor or sensors 102 detecting implement orientation parameters of the blade 34 that indicate the position and the orientation of the blade 34 in a similar manner as described for the machine orientation sensor(s) 100 described above. In some embodiments, the implement orientation sensor or sensors 102 may be mounted on the DCM assembly 24 and/or the blade 34. The implement orientation sensors 102 may then transmit implement orientation sensor signals to the ECM 90 having implement orientation parameter values corresponding to the detected implement orientation parameters in response to detecting movement of the blade 34 or at periodic intervals. In some embodiments, the implement orientation sensor 102 may be an IMU capable of measuring the rotation and elevation of the blade 34. Additionally, or alternatively, the position of the blade 34 relative to the motor grader 10 and the work surface 22 may be derived from the geometry of the motor grader 10 and the operational state of components such as the lift cylinders 42 and the side shift cylinder 52. The dimensions of the frame 20, the DCM assembly 24 and its components, the lift arms 44 and the link bar 48 are known constants. The extensions or effective lengths of the blade pitch cylinder 36, the lift cylinders 42 and the side shift cylinder 52 can likely be determined from their control programs or from cylinder position sensors that sense the hydraulic cylinder displacement, and the locked position of the link bar 48 may be sensed and stored. In other embodiments or in addition, relative rotation between elements connected by pivot joints, such as the connections of the lift cylinders 42 to the lift arms 44 at the yokes 46, may be measured by rotary sensors and output to the ECM 90 in implement orientation sensor signals. With these and/or other parameters available from the implement orientation sensor(s) 102, the ECM 90 may be configured to calculate the implement vertical position of the blade 34 relative to the motor grader 10 and the implement roll of the blade 34 about the longitudinal axis 50. Additionally, as with the machine orientation sensor(s) 100, alternative sensor devices for sensing the position and orientation of the blade 34 and transmitting implement orientation parameter values to the ECM 90 are contemplated.

The operator display device 60 may be any appropriate electronic visual display device capable of displaying the machine orientation display 62 to the operator within the operator station 30. In some embodiments, the operator display device 60 is a display-only device that receives video signals from the ECM 90 with data for producing the machine orientation display 62. The display-only device displays the information on the display, which could be a cathode ray tube (CRT), a light-emitting diode (LED) display, a plasma display panel (PDP), a liquid crystal display (LCD), an organic light-emitting diode (OLED), or any like display. In alternative embodiments, the operator display device 60 may be an input/output device such as a touch-screen that allows the operator to give input or control some of the operations of the motor grader 10 while simultaneously displaying the machine orientation display 62. With an input/output display, the display will generate and transmit user input signals to the ECM 90 as the ECM 90 is transmitting the video signals to the operator display device 60.

INDUSTRIAL APPLICABILITY

Figure 6:
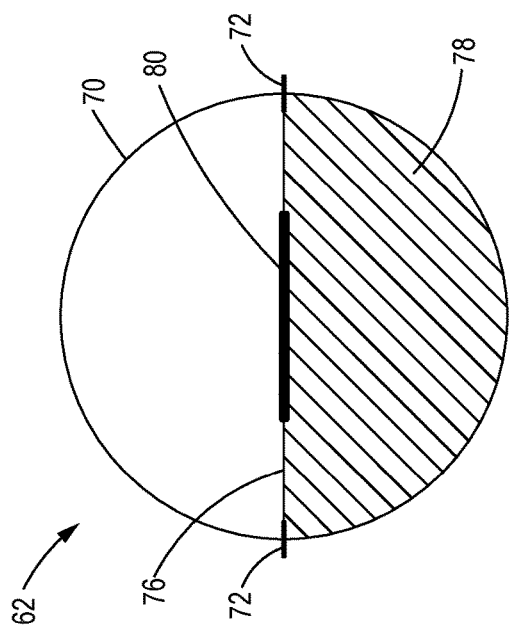
FIG. 6 is a pictorial illustration of the machine orientation display of FIG. 3 when the motor grader has no pitch and no roll and a blade is at work surface level and has no roll.

FIGS. 6-9 illustrated examples of the machine orientation display 62 with the motor grader 10 and the blade 34 in different orientations. FIG. 6 illustrates the motor grader 10 on or traveling over a horizontal work surface 22 and with the blade 34 positioned at grade with the work surface 22 and the bottom of the traction devices 12, 14. The machine orientation sensor signals from the machine orientation sensor 100 indicate that the machine pitch and the roll of the motor grader 10 are zero. In response, the ECM 90 transmits machine orientation display signals to cause the operator display device 60 to display the machine orientation line 76 at the height of and parallel to the horizontal reference lines 72. The implement orientation sensor signals from the implement orientation sensor 102 indicate that the blade 34 is positioned with a bottom edge at grade relative to the work surface 22 with no implement roll. The ECM 90 responds by transmitting implement orientation display signals to cause the operator display device 60 to display the implement orientation line 80 at the same height and horizontal orientation as the machine orientation line 76 and overlaying the machine orientation line 76.

Figure 7:
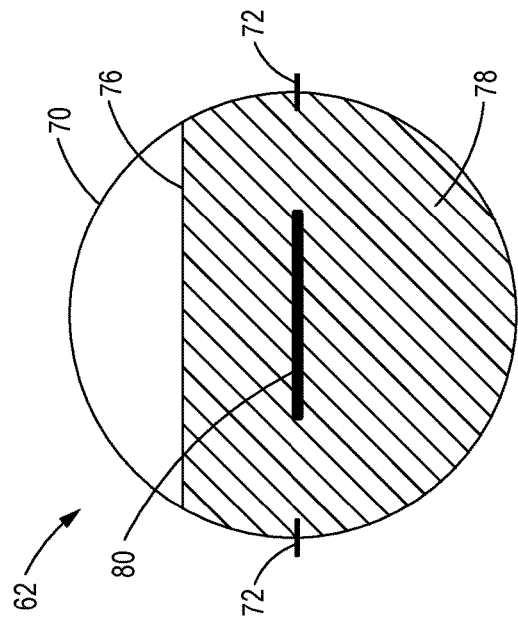
FIG. 7 is a pictorial illustration of the machine orientation display of FIG. 3 when the motor grader has a downhill pitch and no roll and the blade is lowered into a work surface and has no roll.

Referring to FIG. 7, the machine orientation display 62 is illustrated with the motor grader 10 traveling downhill with the blade 34 lowered below grade to dig into or grade the work surface 22. The motor grader 10 and the blade 34 have no roll in this example, so the orientation lines 76, 80 are parallel to the horizontal reference line 72. As the motor grader 10 began traveling downhill, the machine orientation sensor 100 detected the rotation of the motor grader 10 about the transverse axis 56 and the corresponding change in the machine pitch. In response, the machine orientation sensor 100 transmitted machine orientation sensor signals causing the ECM 90 to display the machine orientation line 76 above the horizontal reference lines 72 by a distance corresponding to the machine pitch angle. When a bottom edge of the blade 34 dug into the work surface 22 was buried below grade, the implement orientation sensor 102 detected the changes in the elevation of the blade 34 and transmitted implement orientation sensor signals causing the ECM 90 to display the implement orientation line 80 below the machine orientation line 76 and within the lower shaded portion 78 of the machine orientation display 62.

Figure 8:
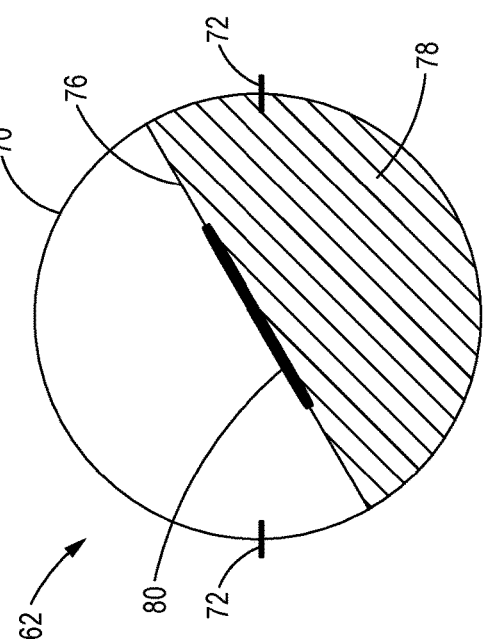
FIG. 8 is a pictorial illustration of the machine orientation display of FIG. 3 when the motor grader has no pitch and counterclockwise roll and the blade is at work surface level and has counterclockwise roll.

FIG. 8 illustrates the machine orientation display 62 indicating that the motor grader 10 has transitioned from the orientation of FIG. 6 to being disposed on a mound or hill that slopes downward from right to left. The blade 34 has not been repositioned relative to the motor grader 10 as the motor grader rolled to the left, so the implement orientation line 80 still overlays and is parallel to the machine orientation line 76. As the motor grader 10 drove onto the hill or mound, the orientation sensors 100, 102 sensed the counterclockwise rotation and roll of the motor grader 10 and the blade 34, respectively. The orientation sensors 100, 102 responded by transmitting orientation sensor signals to the ECM 90 causing the ECM 90 to transmit display signals to the operator display device 60 to display the orientation lines 76, 80 rotated counterclockwise by an angle relative to the horizontal reference lines 72 equal to the roll angle detected by the orientation sensors 100, 102.

Figure 9:
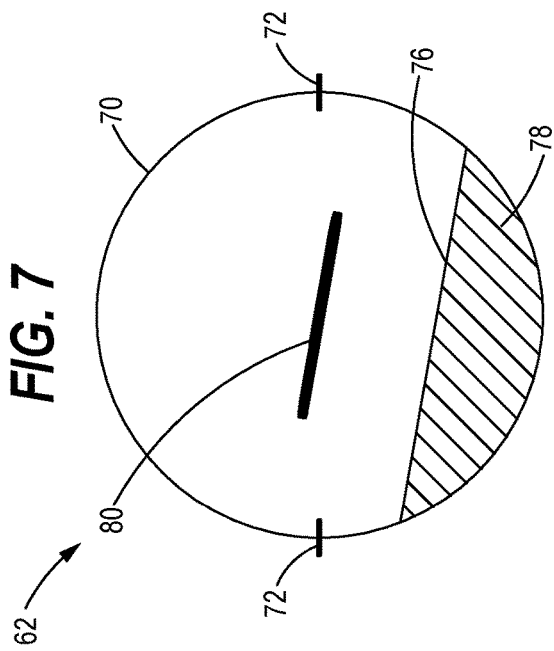
FIG. 9 is a pictorial illustration of the machine orientation display of FIG. 3 when the motor grader has an uphill pitch and clockwise roll and the blade is raised above the work surface and has clockwise roll.

In FIG. 9, the machine orientation display 62 indicates that the motor grader 10 is traveling uphill on a mound or hill that slopes downward from left to right. As the motor grader 10 moved onto the hill, the machine orientation sensor 100 detected both the rearward pitch rotation about the transverse axis 56 and the clockwise roll rotation about the longitudinal axis 50, and transmitted machine orientation sensor signals to the ECM 90 reflecting the changes in both the machine pitch and the machine roll of the motor grader 10. In response, the ECM 90 transmitted machine orientation display signals to the operator display device 60 causing the machine orientation line 76 to be displayed below the horizontal reference lines 72 and rotated clockwise by an angle equal to the machine roll angle of the motor grader 10 on the side of the hill. The machine orientation display signals also cause the lower shaded portion 78 to be correspondingly lowered and reduced in size to further illustrate the uphill pitch of the motor grader 10. The implement orientation sensor 102 detected both the upward movement of the blade 34 relative to the work surface 22 and the clockwise roll rotation with the main body 18 and the frame 20 of the motor grader 10. The implement orientation sensor signals transmitted by the implement orientation sensor 102 to the ECM 90 reflected the changes in both the implement vertical position and the implement roll of the blade 34. The ECM 90 correspondingly transmitted implement orientation display signals causing the implement orientation line 80 to be displayed on the machine orientation display 62 above the machine orientation line 76 and rotated clockwise by the implement roll angle.

Figure 10:
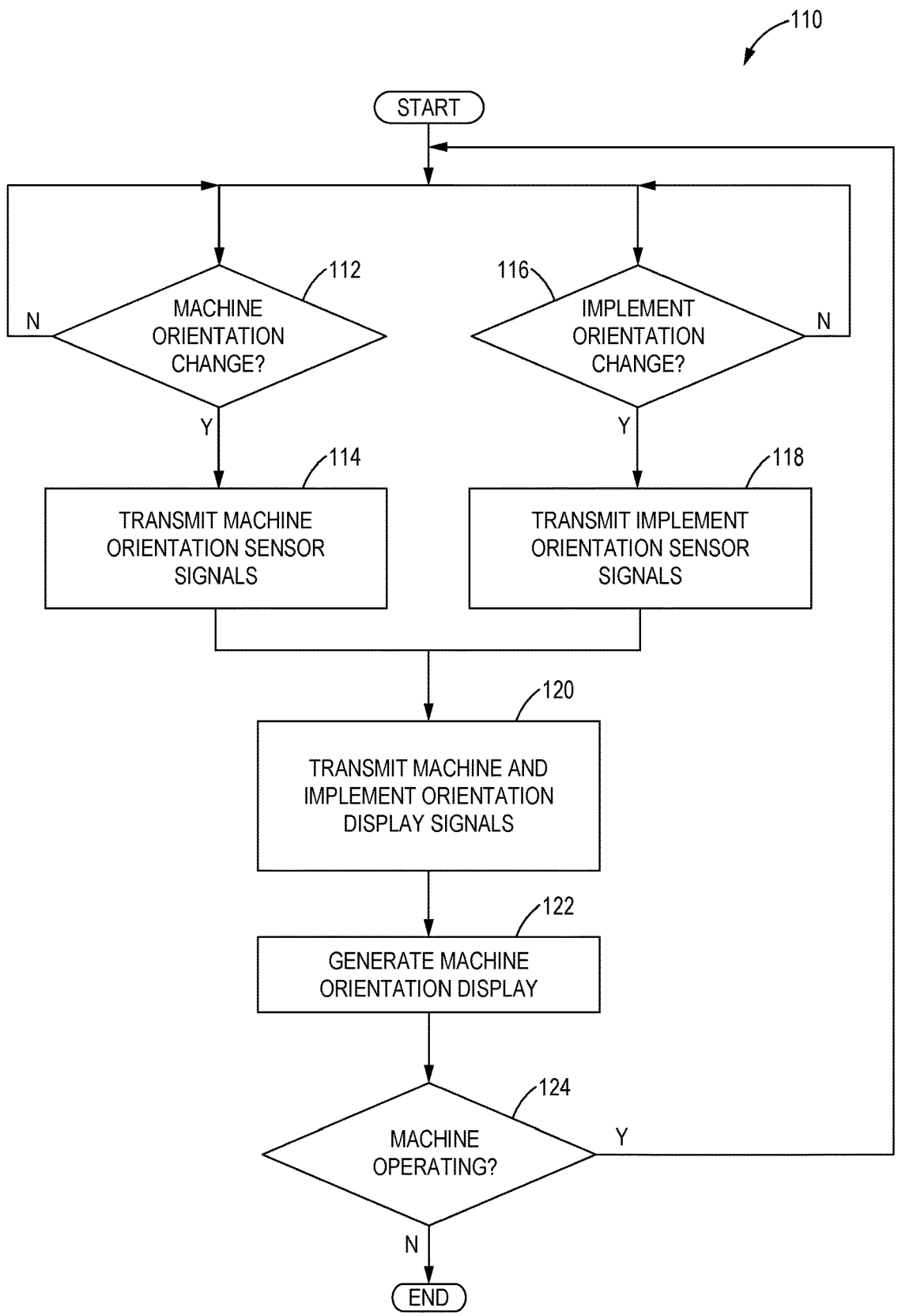
FIG. 10 is a flow chart illustrating machine and implement orientation display routine in accordance with the present disclosure.

FIG. 10 illustrates a flow diagram for an exemplary machine and implement orientation display routine 110 that may be executed by one or more of the electronic components of FIG. 5 to produce and update machine orientation displays 62 such as those shown in FIGS. 6-9 as movements of the motor grader 10 and the blade 34 are detected. The routine 110 may begin at a block 112 where the machine orientation sensor or sensors 100 may evaluate whether a change in the machine orientation is detected. In particular for purposes of the machine orientation display 62, the machine orientation sensor 100 evaluates whether changes in the machine pitch or the machine roll of the motor grader 10 have occurred. If the machine orientation sensor 100 does not detect changes in either the machine pitch or the machine roll of the motor grader 10 at the block 112, a current orientation of the machine orientation line 76 on the machine orientation display 62 may be maintained, and control may pass back to the block 112 for the machine orientation sensor 100 to continue waiting for changes in the machine orientation. If the machine orientation sensor 100 detects a change in the machine pitch, the machine roll, or both for the motor grader 10 at the block 112, control may pass to a block 114 where the machine orientation sensor 100 may generate machine orientation sensor signals having machine orientation values corresponding to a current machine orientation of the motor grader 10, and transmit the machine orientation sensor signals to the ECM 90.

Concurrently with the execution of the blocks 112, 114 by the machine orientation sensor 100, the implement orientation sensor or sensors 102 may be performing similar functions with respect to the orientation of the blade 34. At a block 116, the implement orientation sensor 102 may evaluate whether a change in the orientation of the blade 34 is detected. Relevant to the machine orientation display 62, the implement orientation sensor 102 evaluates whether changes in the implement vertical position of the blade 34 relative to the main body 18 the frame 20 or the implement roll of the blade 34 have occurred. If the implement orientation sensor 102 does not detect changes in either the implement vertical position or the implement roll of the blade 34 at the block 116, a current orientation of the implement orientation line 80 on the machine orientation display 62 may be maintained, and control may pass back to the block 116 for the implement orientation sensor 102 to continue waiting for changes in the orientation of the blade 34. If the implement orientation sensor 102 detects a change in the implement vertical position, the implement roll, or both for the blade 34 at the block 116, control may pass to a block 118 where the implement orientation sensor 102 may generate implement orientation sensor signals having implement orientation parameter values corresponding to a current orientation of the blade 34, and transmit the implement orientation sensor signals to the ECM 90.

When machine orientation sensor signals are transmitted from the machine orientation sensor 100 at the block 114, or implement orientation sensor signals are transmitted from the implement orientation sensor 102 at the block 118, or both, control may pass to a block 120 where the ECM 90 receives the machine orientation sensor signals and/or the implement orientation sensor signals, processes the machine orientation parameter values and/or the implement orientation parameter values, and transmit machine and/or implement orientation display signals to the operator display device 60. The nature of the orientation display signals transmitted by the ECM 90 may vary depending on the manner in which the orientation display signals are processed and converted into the machine orientation display 62. In some embodiments, the orientation display signals may contain all the information necessary for generating the graphical elements of the machine orientation display 62, including the circular field area 70, the horizontal reference line 72, the machine orientation line 76, the lower shaded portion 78 and the implement orientation line 80. In this embodiment, the entire machine orientation display 62 may be regenerated by the ECM 90 and the orientation display signals for the entire machine orientation display 62 may be retransmitted to the operator display device 60 each time machine orientation sensor signals or implement orientation sensor signals are received at the ECM 90.

Additionally, or alternatively, the orientation display signals may be separated between the reference elements of the machine orientation display 62, the machine orientation indicators 74 and the implement orientation line 80, and the orientation display signals transmitted by the ECM 90 may be limited to only those indicating changes in the machine orientation indicators 74 and the implement orientation line 80. In such an arrangement, reference display signals may contain information for generating the circular field area 70 and the horizontal reference lines 72, machine orientation display signals may contain information for generating the machine orientation line 76 and the lower shaded portion 78, and implement orientation display signals may contain information for generating the implement orientation line 80. Machine orientation display signals may be generated and transmitted each time the ECM 90 receives machine orientation sensor signals, and implement orientation display signals may be generated and transmitted each time the ECM 90 receives implement orientation sensor signals. The circular field area 70 and the horizontal reference line 72 are static elements, so the reference display signals may only need to be transmitted at machine startup or when a software modification is made to change the appearance of the reference elements of the machine orientation display 62, for example.

After the machine and implement orientation display signals are transmitted by the ECM 90 at the block 120, control passes to a block 122 where the operator display device 60 receives the display signals from the ECM 90 and uses the information in the display signals to generate the machine orientation display 62 and illustrate the current orientations of the motor grader 10 and the blade 34. The machine orientation display 62 may remain static on the operator display device 60 as long as the operator display device 60 does not receive further display signals from the ECM 90. After the machine orientation display 62 is generated at the block 122, control may pass to a block 124 with the ECM 90 and/or the operator display device 60 may determine whether the motor grader 10 is still operating. If the motor grader 10 is still operating, control may pass back to the blocks 112, 116 for the machine orientation sensor 100 and the implement orientation sensor 102 to continue monitoring for changes in the orientations of the motor grader 10 and the blade 34, respectively. If the ECM 90 for the operator display device 60 determines that the motor grader 10 is no longer operating at the block 124, the machine orientation display 62 no longer needs to be generated and displayed, and the routine 110 may terminate.

Although the illustrated embodiments and the accompanying discussion have concentrated on the application of an the machine orientation display 62 in the motor grader 10, those skilled in the art will understand that similar machine orientation displays 62 may be implemented in other work machines having implements that can be moved relative to the body or frame of the work machine. Consequently, the machine orientation display 62 may be implemented in other work machines such as bulldozers, track-type tractors, wheel loaders, backhoe loaders, excavators, cold planers, mining shovels, skid steer loaders and the like. The machine orientation display 62 may be desirable even in work machines where only the vertical position of the implement can be controlled and there is no adjustable component to the roll of the implement.

Figure 11:
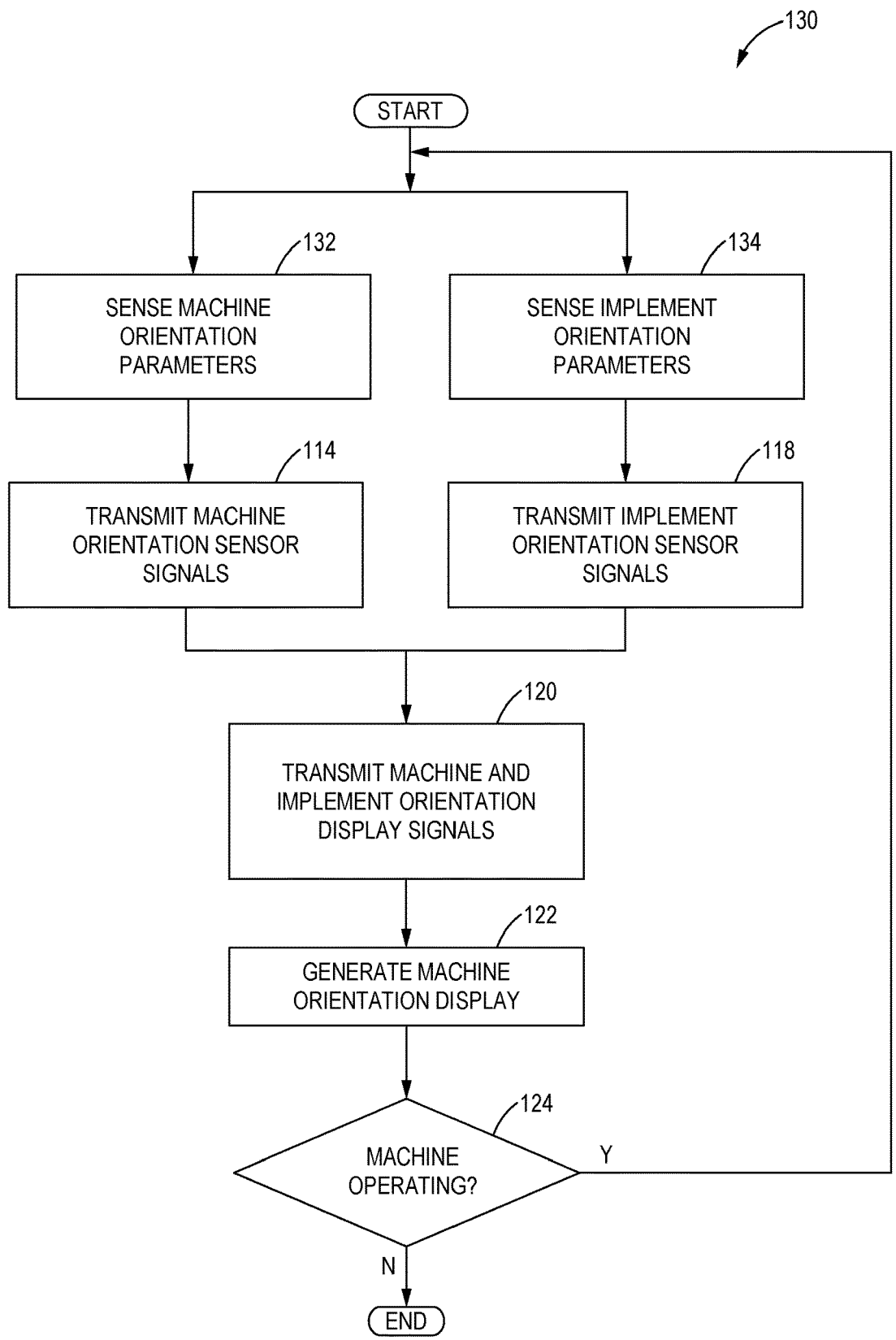
FIG. 11 is a flow chart illustrating an alternative embodiment of a machine and implement orientation display routine in accordance with the present disclosure.

FIG. 11 illustrates an alternative embodiment of machine and implement orientation routine 130 that may periodically update the machine orientation display 62 while the motor grader 10 is turned on and operating, and is not dependent on detecting motion of either the motor grader 10 or the blade 34. The routine 130 may begin at a block 132 where the machine orientation sensors 100 may operate to sense current values of the machine orientation parameters that are used to determine the orientation of the motor grader 10. The machine orientation sensors 100 may be configured with timers that will trigger the machine orientation sensors 100 to sense the machine orientation parameters at a specified sampling rate that will allow the machine orientation display 62 to be updated in a timely manner as necessary for the operator to have a current, accurate graphical image of the machine orientation. Additionally, or alternatively, the ECM 90 may control the periodic sampling of the machine orientation parameters by transmitting sensor control signals to the machine orientation sensors 100 that poll the sensors 100 for current values of the machine orientation parameters. Regardless of the manner of initiating the sensing performed by the machine orientation sensors 100, the sensors 100 detect the current values of the machine orientation parameters 100 at the block 132, and control passes to the block 114 where the machine orientation sensors 100 generate the machine orientation sensor signals, and transmit the machine orientation sensor signals to the ECM 90.

Concurrently with the execution of the blocks 132, 114, the implement orientation sensors 102 may operate to sense current values of the implement orientation parameters that are used to determine the orientation of the blade 34 at a block 134. Similar to the sensing by the machine orientation sensors 100, the implement orientation sensors 102 may be configured to sense the implement orientation parameters at the same or a difference specified sampling rate, or the ECM 90 may poll the implement orientation sensors 102 for current values of the implement orientation parameters. After the sensing is performed by the implement orientation sensors 102 at the block 134, control passes to the block 118 where the implement orientation sensors 102 generate the implement orientation sensor signals, and transmit the implement orientation sensor signals to the ECM 90 in a similar manner as described above.

After the orientation sensor signals are transmitted at the blocks 114, 118, control will pass to the blocks 120, 122, 124 in a similar manner as described for the routine 110 to transmit machine and implement orientation display signals, to generate the machine orientation display 62, and to determine if the motor grader 10 is still operating. If the motor grader 10 is still operating at the block 124, control will pass back to the blocks 132, 134 to sense the current values of the orientation parameters according to the specified sampling rate. When the motor grader 10 is no longer operating at the block 124, the routing 130 will terminate.

Figure 12:
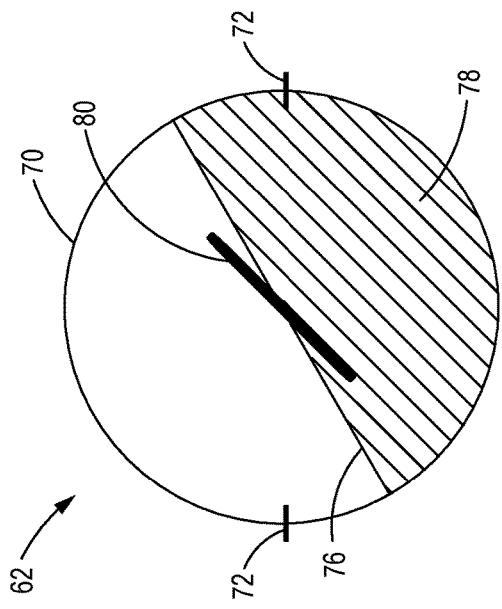
FIG. 12 is a pictorial illustration of the machine orientation display of FIG. 3 when the motor grader has no pitch and no roll and the blade at work surface is level and has counterclockwise roll.
Figure 13:
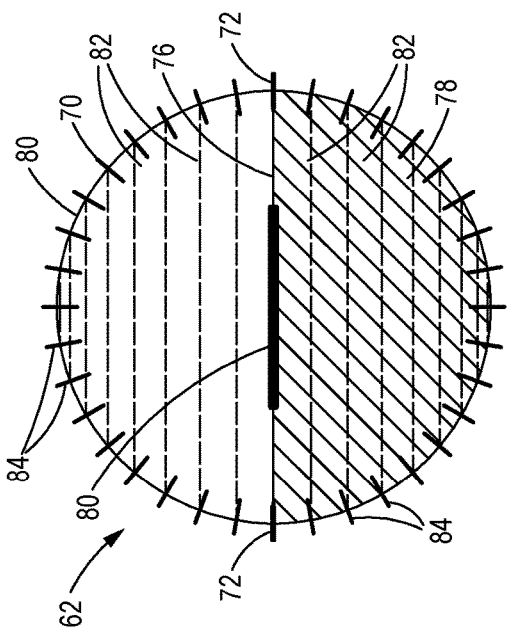
FIG. 13 is a pictorial illustration of the machine orientation display of FIG. 3 when the motor grader has no pitch and counterclockwise roll and the blade is at work surface level and has further counterclockwise roll.
Figure 14:
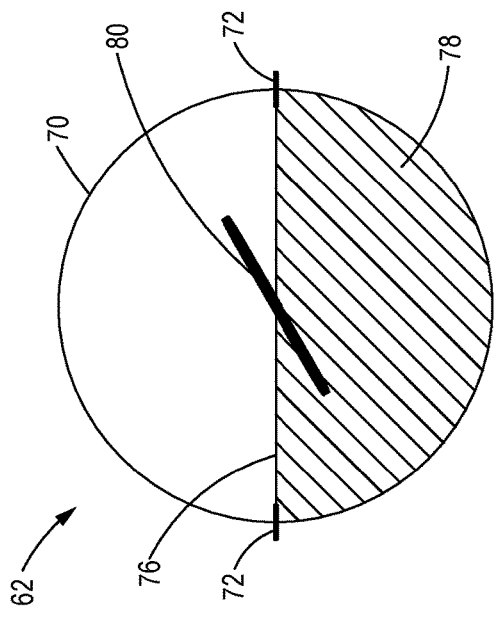
FIG. 14 is a pictorial illustration of the machine orientation display of FIG. 3 when the motor grader has no pitch and counterclockwise roll and the blade is at work surface level and rotated to reduce the counterclockwise roll to the position of FIG. 12.

As an example of the implementation of the machine orientation display 62 in alternative work machines, FIGS. 12-14 illustrate a series of machine orientation displays 62 that may be provided to an operator of a track-type tractor performing a trench digging operation of the work surface 22. The track-type tractor may include an undercarriage having tracks on either side, and an implement such as a bucket or a blade mounted on lift arms at the front of the tractor. The implement is mounted on the lift arm in a manner that provides some ability to move the lift arms independently to roll the implement about a longitudinal axis of the tractor in addition to raising and lowering the implement.

FIG. 12 illustrates the machine orientation display 62 for the tractor at the beginning of the trenching operation. The machine orientation sensor 100 has determined that the tractor is sitting on a level work surface with no machine pitch and no machine roll. Consequently, the machine orientation line 76 is oriented parallel to and at the same height as the horizontal reference lines 72, similar to the machine orientation display 62 in FIG. 6. To start the trenching operation, one side of the implement digs into the work surface 22 to remove material from the trench as the tractor drives over the work surface 22. In the present example, the operator manipulates the implement position input devices 54 of the tractor to cause the lift arms to rotate the implement with a counterclockwise roll and lower a left side of the implement below grade and dig into the work surface 22, while raising the right side of the implement above grade and out of engagement with the work surface 22. The implement orientation sensor 102 detects the movement of the implement and transmits implement orientation sensor signals to the ECM 90 with implement orientation values representing the current implement vertical position and the current implement roll angle of the implement. Display signals from the ECM 90 then cause the operator display device 60 to change the display of the implement orientation line 80 to be rotated counterclockwise to the current implement roll angle and with a left portion below the machine orientation line 76 and a right portion above the machine orientation line 76 as shown in FIG. 12. As illustrated, the implement roll angle is approximately 15° counterclockwise.

As the tracks of the undercarriage begin to propel the tractor forward over the work surface 22, the left portion of the implement begins to dig the trench. When the undercarriage reaches the trench, the left track drives into the trench while the right track remains at grade leveling over the work surface 22. As the left track enters the trench, the machine orientation sensor 100 detects counterclockwise rotation of the tractor, and transmits machine orientation sensor signals to the ECM 90 having machine orientation values indicating the machine roll angle. The ECM 90 responds by transmitting machine orientation display signals to the operator display device 60 to cause the machine orientation line 76 to be displayed in the rotated position shown in the machine orientation display 62 of FIG. 13. If the operator does not manipulate the implement position input device 54 to cause the lift arms to rotate the implement relative to the body of the tractor, the implement will roll in the counterclockwise direction along with the tractor. The further rotation of the implement is detected by the implement orientation sensor 102, and implement orientation sensor signals are transmitted to the ECM 90 that result in the implement orientation line 80 rotating counterclockwise on the machine orientation display 62 from the position of FIG. 12 to the position of FIG. 12.

If the implement roll of the implement is not adjusted after the left track enters the trench, the left side of the implement digs a deeper into the work surface 22 than at the onset of the trenching operation. However, the machine orientation display 62 provides the operator with a visual indication that the implement may have rolled too far to the left to dig the trench at the desired depth. In response, the operator may manipulate the implement position input devices 54 to cause the lift arms to perform a clockwise rotation of the implement back to the implement roll angle needed to cut the trench at the required depth. As the lift arms rotate the implement in the clockwise direction relative to the tractor body and the work surface 22, the implement orientation sensor 102 detects the movement of the implement and transmits implement orientation sensor signals to the ECM 90 to cause the implement orientation line 80 to be displayed on the machine orientation display 62 in the position shown in FIG. 14.

Those skilled in the art will understand that the machine orientation display 62 may have alternative configurations to those illustrated and described herein, while still providing the operator with a graphical illustration of the machine pitch and machine roll of the machine and the implement vertical position and implement roll of the implement of the machine relative to a reference. For example, the implement orientation line 80 may be replaced by a graphical representation of an implement such as a blade or bucket that is moved around the circular field area 70 in a similar manner as described herein relative to the horizontal reference lines 72 and the machine orientation line 76.

Figure 15:
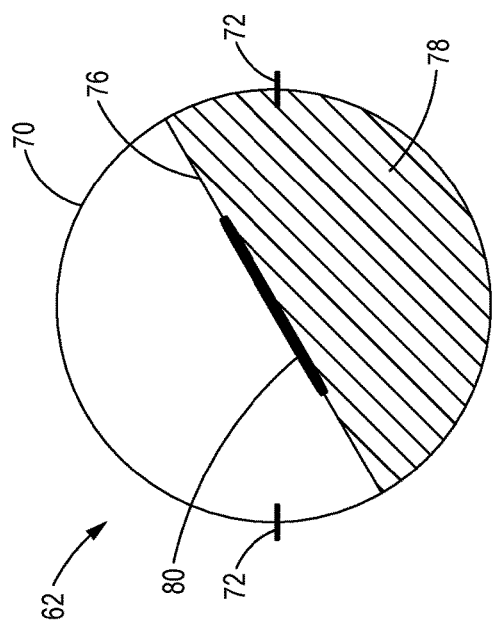
FIG. 15 is a pictorial illustration of an alternative embodiment of a machine orientation display in accordance with the present disclosure.

Additionally, the circular field area 70 may be enhanced to provide the operator with additional information or references for more precise understanding of the orientations of the machine and the implement. For example, the machine orientation display 62 illustrated in FIG. 15 includes pitch reference lines 82 and roll reference lines 84. The pitch reference lines 82 may be spaced vertically one from another at a constant increment of pitch angle. As illustrated, the pitch reference lines 82 represent 10° increments of pitch angle such that the first pitch reference line 82 above the horizontal reference line 72 corresponds to 10° of forward or downhill pitch, the second pitch reference line 82 indicates 20° of downhill pitch, and so on. The roll reference lines 84 may similarly indicate discrete increments of roll angle starting at the horizontal reference line 72. Further alternative graphics for displaying the orientations of the machine and the implement and providing additional graphical references to assist the operator in comprehending the orientations of the machine and the implement are contemplated by the inventor as having use in machine orientation displays 62 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A machine orientation display displayed by an operator display device in an operator station of a machine, the machine orientation display comprising:
   a field area;
   a horizontal reference displayed on the field area;
   a machine orientation indicator displayed on the field area and being positioned and oriented relative to the horizontal reference to graphically indicate a machine orientation of the machine relative to a work surface on which the machine is disposed; and
   an implement orientation indicator displayed on the field area and being positioned and oriented relative to the horizontal reference and the machine orientation indicator to graphically indicate an implement orientation of an implement of the machine,
      the implement being movable relative to a machine body of the machine and to the work surface;
   wherein the machine orientation includes a machine pitch rotation about a transverse axis of the machine, and wherein a vertical position of the machine orientation indicator relative to the horizontal reference corresponds to a machine pitch angle of the machine orientation; and
   wherein the machine orientation indicator is positioned above the horizontal reference when the machine is traveling downhill on the work surface and is rotated forward about the transverse axis, and wherein the machine orientation indicator is positioned below the horizontal reference when the machine is traveling uphill on the work surface and is rotated rearward about the transverse axis.

2. The machine orientation display of claim 1, wherein the machine orientation includes a machine roll rotation about a longitudinal axis of the machine, and wherein a machine indicator rotation of the machine orientation indicator relative to the horizontal reference corresponds to a machine roll angle of the machine orientation.

3. The machine orientation display of claim 2, wherein the machine orientation indicator is rotated clockwise relative to the horizontal reference when the work surface slopes downward from left to right and the machine is rotated clockwise about the longitudinal axis, and wherein the machine orientation indicator is rotated counterclockwise relative to the horizontal reference when the work surface slopes downward from right to left and the machine is rotated counterclockwise about the longitudinal axis.

4. The machine orientation display of claim 1, wherein the implement orientation includes an implement vertical position relative to the machine body of the machine and the work surface, wherein an implement indicator vertical position of the implement orientation indicator relative to the machine orientation indicator corresponds to the implement vertical position of the implement, wherein the implement orientation indicator is above the machine orientation indicator when the implement vertical position is above the work surface, and wherein the implement orientation indicator is below the machine orientation indicator when the implement is lowered into the work surface.

5. The machine orientation display of claim 1, wherein the implement orientation includes an implement roll rotation about a longitudinal axis of the machine, and wherein an implement rotation of the implement orientation indicator relative to the horizontal reference corresponds to an implement roll angle of the implement orientation, wherein the implement orientation indicator is rotated clockwise relative to the horizontal reference when the implement is rotated clockwise about the longitudinal axis, and wherein the implement orientation indicator is rotated counterclockwise relative to the horizontal reference when the implement is rotated counterclockwise about the longitudinal axis.

6. A method for displaying a machine orientation of a machine to an operator of the machine, the method comprising:
   sensing, by a machine orientation sensor, a machine orientation parameter value of a machine orientation parameter,
      the machine orientation parameter being indicative of the machine orientation;
   determining, at an electronic control module (ECM) of the machine, the machine orientation based on the machine orientation parameter value;
   determining, at the ECM, whether the machine is traveling downhill on a work surface and is rotated forward about the transverse axis;
   determining, at the ECM, whether the machine is traveling uphill on the work surface and is rotated rearward about the transverse axis;
   transmitting, from the ECM to an operator display device within an operator station of the machine, machine orientation display signals; and
   generating, at the operator display device, a machine orientation display of the machine orientation using the machine orientation display signals transmitted by the ECM,
   displaying, at the operator display device, the machine orientation indicator above the horizontal reference when the machine is traveling downhill on the work surface and is rotated forward about the transverse axis; and
   displaying, at the operator display device, the machine orientation indicator below the horizontal reference when the machine is traveling uphill on the work surface and is rotated rearward about the transverse axis;
      wherein the machine orientation display includes a horizontal reference and a machine orientation indicator, and
      wherein a machine indicator vertical position of the machine orientation indicator relative to the horizontal reference indicates a machine pitch angle of the machine about a transverse axis of the machine.

7. The method of claim 6, wherein the machine orientation includes a machine roll rotation about a longitudinal axis of the machine, and wherein the method comprises displaying the machine orientation indicator rotated relative to the horizontal reference with a machine indicator rotation that corresponds to a machine roll angle of the machine orientation.

8. The method of claim 7, comprising:
determining, at the ECM, whether the machine is on a work surface that slopes downward from left to right and is rotated clockwise about the longitudinal axis;
determining, at the ECM, whether the work surface slopes downward from right to left and the machine is rotated counterclockwise about the longitudinal axis;
displaying, at the operator display device, the machine orientation indicator rotated clockwise relative to the horizontal reference when the work surface on which the machine is disposed slopes downward from left to right and the machine is rotated clockwise about the longitudinal axis; and
displaying, at the operator display device, the machine orientation indicator rotated counterclockwise relative to the horizontal reference when the work surface slopes downward from right to left and the machine is rotated counterclockwise about the longitudinal axis.

9. The method of claim 6, wherein the machine includes an implement that is movable relative to a machine body of the machine, the method comprising:
sensing, by an implement orientation sensor, an implement orientation parameter value of an implement orientation parameter,
the implement orientation parameter being indicative of an implement orientation of the implement;
determining, at the ECM, the implement orientation of the implement based on the implement orientation parameter value;
transmitting, from the ECM to the operator display device, implement orientation display signals;
generating, at the machine orientation display, an implement orientation indicator of the implement orientation,
wherein an implement indicator vertical position of the implement orientation indicator relative to the machine orientation indicator corresponds to an implement vertical position of the implement relative to the machine body.

10. The method of claim 9, comprising:
determining, at the ECM, whether the implement vertical position is above a work surface on which the machine is disposed;
determining, at the ECM, whether a bottom edge of the implement is dug into the work surface and buried below grade;
displaying, at the operator display device, the implement orientation indicator above the machine orientation indicator when the implement vertical position is above the work surface; and
displaying, at the operator display device, the implement orientation indicator below the machine orientation indicator when the implement is dug into the work surface and buried below grade.

11. The method of claim 9, wherein the implement orientation includes an implement roll rotation about a longitudinal axis of the machine, the method comprising displaying the implement orientation indicator with an implement indicator roll rotation relative to the horizontal reference that corresponds to an implement roll angle of the implement orientation, wherein the implement orientation indicator is rotated clockwise relative to the horizontal reference when the implement is rotated clockwise about the longitudinal axis, and wherein the implement orientation indicator is rotated counterclockwise relative to the horizontal reference when the implement is rotated counterclockwise about the longitudinal axis.

12. A machine comprising:
a machine body;
an implement that is movable relative to the machine body;
a machine orientation sensor mounted on the machine body and configured to:
  detect a machine orientation parameter value of a machine orientation parameter that is indicative of a machine orientation of the machine body, and
  transmit machine orientation sensor signals with machine orientation parameter values corresponding to the machine orientation;
  wherein the machine orientation includes a machine pitch rotation about a transverse axis of the machine;
an implement orientation sensor associated with the implement and configured to:
  detect an implement orientation parameter value of an implement orientation parameter that is indicative of an implement orientation of the implement, and
  transmit implement orientation sensor signals with implement orientation parameter values corresponding to the implement orientation;
an operator display device disposed within an operator station of the machine and configured to:
  receive display signals, and
  generate a visual display corresponding to display information in the display signals; and
an electronic control module (ECM) operatively connected to the machine orientation sensor, the implement orientation sensor and the operator display device, the ECM being configured to
  receive the machine orientation sensor signals and the implement orientation sensor signals,
  generate machine orientation display signals corresponding to the machine orientation parameter values and implement orientation display signals corresponding to the implement orientation parameter values,
  transmit the machine orientation display signals and the implement orientation display signals to the operator display device to cause the operator display device to generate a machine orientation display,
  determine whether the machine is traveling downhill on a work surface and is rotated forward about the transverse axis based on the machine orientation sensor signals,
  determine whether the machine is traveling uphill on the work surface and is rotated rearward about the transverse axis based on the machine orientation sensor signals,
  transmit the machine orientation display signals to the operator display device to cause the operator display device to position the machine orientation indicator above the horizontal reference when the machine is traveling downhill on the work surface and is rotated forward about the transverse axis, and
  transmit the machine orientation display signals to the operator display device to cause the operator display device to position the machine orientation indicator below the horizontal reference when the machine is traveling uphill on the work surface and is rotated rearward about the transverse axis;

the machine orientation display including:
a field area,
a horizontal reference displayed on the field area,
a machine orientation indicator displayed on the field area and being positioned and oriented relative to the horizontal reference to graphically indicate the machine orientation of the machine, and
an implement orientation indicator displayed on the field area and being positioned and oriented relative to the horizontal reference and the machine orientation indicator to graphically indicate the implement orientation of the implement.

13. The machine of claim 12, wherein the machine orientation includes a machine roll rotation about a longitudinal axis of the machine, and wherein the ECM is configured to:

determine whether a work surface on which the machine is disposed slopes downward from left to right and the machine is rotated clockwise about the longitudinal axis, determine whether the work surface on which the machine is disposed slopes downward from right to left and the machine is rotated counterclockwise about the longitudinal axis, transmit the machine orientation display signals to the operator display device to cause the operator display device to rotate the machine orientation indicator clockwise relative to the horizontal reference when the work surface on which the machine is disposed slopes downward from left to right and the machine is rotated clockwise about the longitudinal axis, and transmit the machine orientation display signals to the operator display device to cause the operator display device to rotate the machine orientation indicator counterclockwise relative to the horizontal reference when the work surface on which the machine is disposed slopes downward from right to left and the machine is rotated counterclockwise about the longitudinal axis.

14. The machine of claim 12, wherein the implement orientation includes an implement vertical position relative to the machine body and a work surface on which the machine is disposed, and wherein the ECM is configured to:

determine whether the implement vertical position is above the work surface, determine whether a bottom edge of the implement is dug into the work surface and buried below grade, transmit the machine orientation display signals to the operator display device to cause the operator display device to position the implement orientation indicator above the machine orientation indicator when the implement vertical position is above the work surface, and transmit the machine orientation display signals to the operator display device to cause the operator display device to position the implement orientation indicator below the machine orientation indicator when the bottom edge of the implement is dug into the work surface and buried below grade.

15. The machine of claim 12, wherein the implement orientation includes an implement roll rotation about a longitudinal axis of the machine, and wherein the ECM is configured to:

determine whether the implement is rotated clockwise about the longitudinal axis, determine whether the implement is rotated counterclockwise about the longitudinal axis, transmit the machine orientation display signals to the operator display device to cause the operator display device to rotate the implement orientation indicator clockwise relative to the horizontal reference when the implement is rotated clockwise about the longitudinal axis, and transmit the machine orientation display signals to the operator display device to cause the operator display device to rotate the implement orientation indicator counterclockwise relative to the horizontal reference when the implement is rotated counterclockwise about the longitudinal axis.

16. The machine of claim 12, wherein the field area is circular and the horizontal reference is a horizontal line.

* * * * *